(No Model.)

L. LENAERTS.
MEANS FOR OPERATING THE STOP COCKS OF GAS METERS.

No. 349,109. Patented Sept. 14, 1886.

UNITED STATES PATENT OFFICE.

LEON LENAERTS, OF BRUSSELS, BELGIUM.

MEANS FOR OPERATING THE STOP-COCKS OF GAS-METERS.

SPECIFICATION forming part of Letters Patent No. 349,109, dated September 14, 1886.

Application filed October 5, 1885. Serial No. 179,043. (No model.) Patented in Belgium February 14, 1885, No. 67,8-8, and in France August 17, 1885, No. 158,057.

*To all whom it may concern:*

Be it known that I, LEON LENAERTS, a subject of the King of Belgium, residing at Brussels, in the Kingdom of Belgium, have invented a new and useful Improvement in Means for Operating the Stop-Cocks of Gas-Meters from a Distance, of which the following is a specification.

The means for closing and opening the cocks of gas-meters, forming the subject of the present invention, has for its object the permitting of the operation of such cocks from any part of the building or house containing the meter. It is generally admitted that it is imprudent to allow the meter to remain open when the gas is not being used, and that it is rarely that the meters are closed with regularity, this by reason of the necessity, ordinarily, to descend into the cellar to close the meter, where, immediately after shutting off the gas, it is impossible to obtain light without returning to the meter. This inconvenience, although great in houses occupied by a single family, becomes insurmountable in apartment-houses, in which each apartment has its separate meter in the cellar. The apparatus hereinafter described is designed to remedy these inconveniences with perfect facility and safety.

Figure 1:
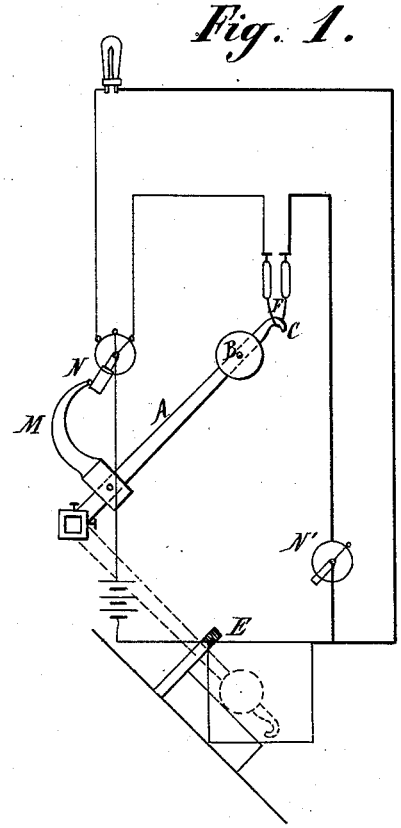
Figure 2:
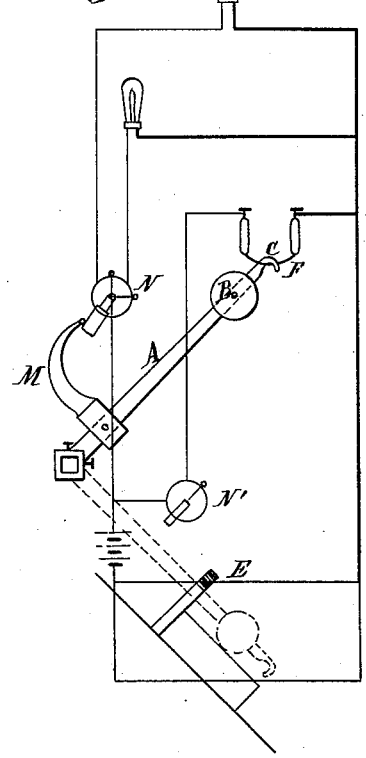

Figures 1 and 2 are diagrammatic views of different arrangements of an electric circuit for carrying out the invention, which is especially intended for public buildings, theaters, &c., the apparatus being so placed as to enable its operation from different parts of the building by means of contact-buttons, a light pressure on which is sufficient to close the circuit.

With the object of avoiding the dangers resulting from the extinction of all the lights by the shutting off of the gas at the meter, I prefer to employ an electric current, after thus shutting off the gas, to supply electric lamps, which are thus automatically put into operation when the flow of gas is stopped.

In the drawings, A represents the key of the main cock in the gas-supply pipe of the meter. This key is made in the form of a lever of sufficient length to close the cock under the influence of the weight B, preferably weighing about five kilos more than is necessary to move the lever. The lever is arranged in such a manner as to be capable of making only a quarter of a revolution about the axis of the cock. The upper extremity of the lever is made in the form of a hook, C, which when the cock is open, is hung on a fine-wire conductor, F, fixed at its ends to two binding-posts isolated from each other, except by way of the wire F, and communicating with the opposite poles of a storage or other battery. The strength of the wire F is such that, while at normal temperature it is able to support the lever A and weight B, as soon as it becomes incandescent by the passage of a strong current of electricity it is broken under such burden. If it be desired at a given moment to close the meter, it is necessary simply to complete an electric circuit through the wire F by pressing on a contact-button, N', at any convenient point in the circuit. The current traversing the fine wire F promptly destroys it, and the weight B under the influence of gravity falls, drawing with it the lever A and closing the cock at the meter. To avoid the rebounding of the weight B on falling, I provide a spring-dog, E, which maintains the lever A in its lowermost position until released.

If electric lamps be employed, adapted to be illuminated after the closing of the meter, they can be so placed in the circuit as to be automatically supplied with electricity on the breaking of the wire F. The illumination of the lamps will not take place before such breaking of the wire F, the latter having a circuit of less resistance. Such an arrangement is represented in Fig. 1. The lever A carries an arm, M, operating a switch, N, which, when the meter is closed by the fall of the weight B, shifts to supply the current to the circuit of lamps. In establishments which possess an electric lighting system the switch is arranged as shown in Fig. 2. By the fall of weight B the circuit of such lamps as are now unnecessary is opened, while the switch N closes the circuit of the safety-lamps.

N' is a switch capable of being operated by hand for closing the circuit through the wire F. It will be seen that the cutting off of the gas and the illuminating of the safety-lamps may be effected by separate means, or so arranged as to be produced by the operation of a single button, as preferred. In this case the contact-buttons are not made elastic, as in ordinary annunciators, but are arranged to remain in the position in which they are placed on the application of pressure.

To provide against danger from fire the positive and negative poles of the apparatus can be covered with an insulating material easily fusible and wound one on the other. The insulator being destroyed by heat, the circuit through the wire F would be completed, and the closing of the meter thus effected.

The various arrangements described are intended merely to serve as examples, and any other arrangements having the same results from the same means are evidently included within the scope of my invention.

I am aware that it is not new to operate an electric-light circuit in connection with a gas-light system and to employ in the electric-light circuit a magnet which controls a cock in the gas-pipe, as well as devices for electrically igniting the gas, the whole being so arranged that on the cutting out of the lamps the stop-cock in the gas-pipe will be opened and the gas automatically ignited. With this device, however, the opposite action, which is involved in my invention, does not take place. The operating of the stop-cock in the gas-pipe does not automatically control the electric-light circuit.

Having thus described my invention, the following is what I claim as new therein and desire to secure by Letters Patent—

1. In combination with a gas meter having a key weighted and adapted to operate substantially as described, a conductor of fine wire supporting said key, and an electric circuit including said fine-wire conductor, a source of electricity, and keys for opening or closing said circuit, substantially as set forth.

2. In combination with a gas-meter having a key weighted and adapted to operate substantially as described, a conductor of fine wire supporting said key, an electric circuit including said fine-wire conductor, a source of electricity, and keys for opening or closing said circuit, the indicating-circuit including lamps, and a switch operated by the meter-key to close said indicating-circuit on the breaking of the main circuit, substantially as set forth.

3. In combination with a weighted gas-meter key and a switch controlled thereby, a source of electricity and three parallel circuits, two being lamp-circuits controlled by said switch, so that one will be open while the other is closed, and the third circuit being normally open and including a contact-button and fine-wire conductor, normally supporting said weighted key, substantially as and for the purpose set forth.

In testimony whereof I have signed this specification in the presence of two subscribing witnesses.

LEON LENAERTS.

Witnesses:
EMILE FUARD,
HUBERT FELL.